United States Patent Office 3,152,446
Patented Oct. 13, 1964

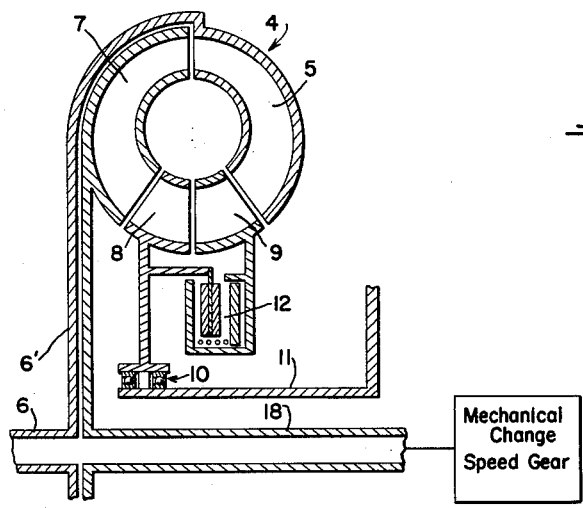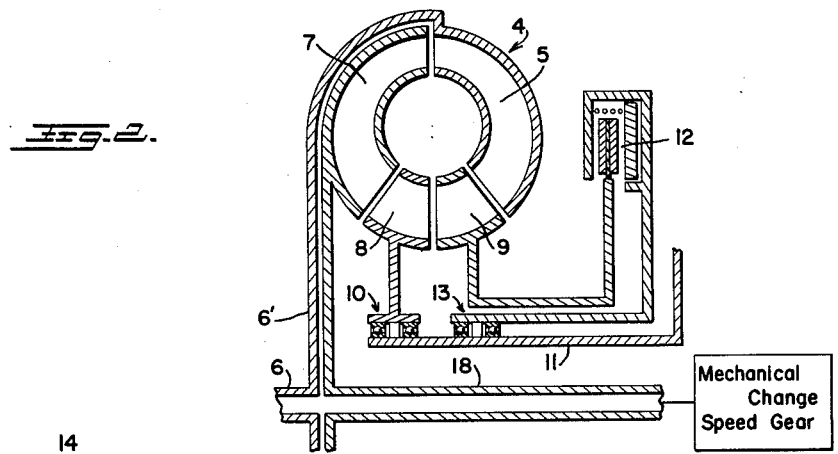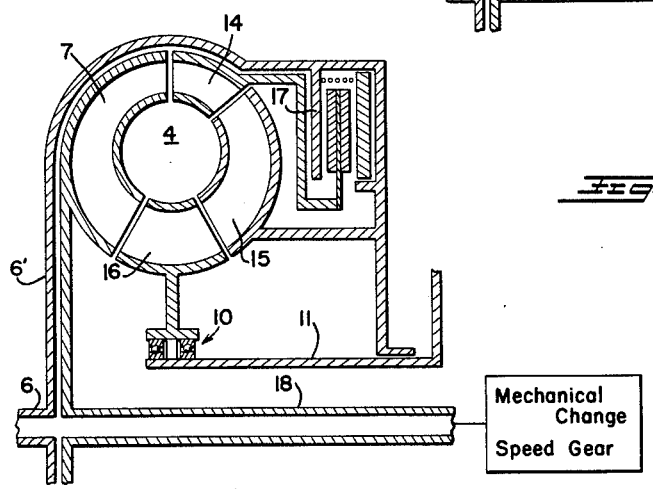

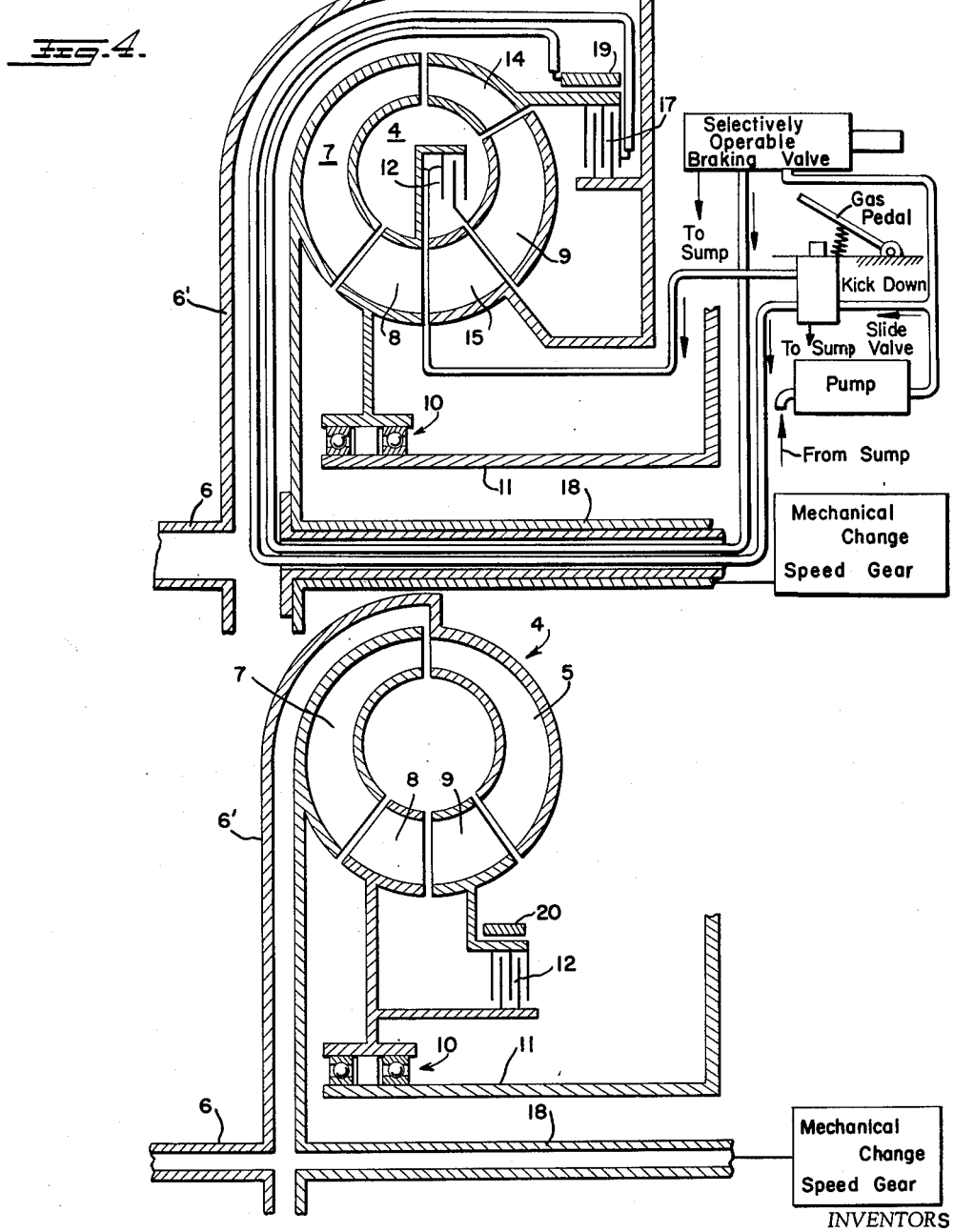

3,152,446
TRANSMISSION WITH HYDRODYNAMIC
DEVICE
Hans-Joachim M. Foerster, Stuttgart-Bad Cannstatt, and Manfred H. Burckhardt, Stuttgart, Germany, assignors to Daimler-Benz Aktiengesellschaft, Stuttgart-Unterturkheim, Germany
Filed Oct. 14, 1957, Ser. No. 690,133
Claims priority, application Germany Oct. 13, 1956
1 Claim. (Cl. 60—54)

The present invention relates to a change speed gear, particularly for a motor vehicle, consisting of a hydrodynamic unit and of a mechanical unit operatively connected therewith, and more particularly relates to a control arrangement for changing the input power capacity characteristics of the hydrodynamic device.

It is known in the prior art to combine a hydrodynamic unit and a mechanical unit into a change speed gear for motor vehicles. In the ever-present attempt to render the so-called fluid transmissions particularly suitable for use thereof in motor vehicles, a compromise has to be made always, particularly in the hydrodynamic part thereof between the availability of as large as possible a power output and as small as possible a power loss within the transmission. These considerations have led to a construction of a hydrodynamic torque converter in such a manner that in the normal operating range thereof, the torque converter operates with particularly small losses, accompanied, however, with a relinquishment of maximum driving power output.

In such prior art devices, a relatively large driving power output is offered within a special accelerating range which, however, is not obtained by shifting back to a lower speed in the mechanical change-speed gear thereof, and which is accompanied by relatively high losses. For this purpose, adjustable guide vanes or stator elements are used in such prior art torque converters as a solution for this problem whereby, however, the overall fluid transmission becomes much more complicated in its construction and thereby also becomes much more expensive.

The present invention has as its primary object the provision of a simple solution to this problem. More particularly, the present invention consists therein that in a change-speed gear, consisting of a hydrodynamic unit and of a mechanical unit, a torque converter is provided for the hydrodynamic unit, the driving member or impeller of which and/or the stator or guide vane member of which are subdivided into individual separate wheels which are adapted to be coupled or connected with each other or with a portion of the stationary transmission housing.

According to a further feature in accordance with the present invention, the selective engagement and disengagement of the individual driving or impeller members and/or guide or reactors members are actuatable at will, for example, by pressing down on the gas pedal beyond a predetermined pressure point or point of resistance to provide thereby a so-called "kick-down" control noticeable to the driver.

The present invention offers the advantage that the torque converter has constructively speaking a very simple structure. The transition between the two operating ranges thereof takes place rapidly, however, without any hard shocks. Furthermore, the torque converter in accordance with the present invention may advantageously be constructed as a vehicle brake.

Torque converts are known in the prior art with subdivided guide or stator members and/or driving or impeller members; however, these prior art arrangements serve an entirely different purpose. More particularly, such prior art devices are designed only with the point of view toward greatest efficiency. In contrast thereto, the present invention proposes a subdivision in such a manner that between the two operating conditions or ranges as large as possible a difference in the power input capacity results. In the known prior art arrangement, in addition thereto, the individual guide or stator and/or driving or impeller parts are not engageable with one another, and particularly are not adapted to be selectively coupled or connected with each other at will. For such an arrangement would also be contrary to the task and purpose of maximum efficiency in such prior art arrangements which were to be attained with such arrangements.

Accordingly, it is an object of the present invention to provide a change-speed transmission including a torque converter and mechanical change-speed gear which is simple in structure, versatile in operation and relatively highly efficient under normal operations conditions.

Still another object of the present invention resides in the provision of a transmission for motor vehicles including a hydrodynamic unit such as a torque converter and a change-speed unit connected therewith which produces two vastly different operating conditions or ranges for the torque converter operations to satisfy the requirements of the transmission during normal operation as well as during short periods of desired acceleration of the vehicle.

Another object of the present invention resides in the provision of a torque converter in combination with an automatically controlled mechanical change-speed gear forming a transmission unit for motor vehicles in which the torque converter is adapted to be operated by simple means in two operating conditions which are as different as possible from one an other and which may be engaged rapidly by simple shifting operations and without any undue shocks.

Another object of the present invention resides in the provision of a torque converter which, in addition to obtaining all the aforementioned objects, may also be used as vehicle brake.

These and further objects of the present invention will become more obvious from the following description when taken in connection with the accompanying drawing, which shows, for purposes of illustration only, several embodiments in accordance with the present invention and wherein:

FIGURE 1 is a diagrammatic view of a first embodiment of a torque converter in accordance with the present invention having subdivided reactor elements or guide members;

FIGURE 2 is a diagrammatic view of a modified embodiment of a torque converter in accordance with the present invention similar to FIGURE 1 and also provided with subdivided reactor elements or guide members;

FIGURE 3 is a diagrammatic view of still another embodiment of a torque converter in accordance with the present invention provided with subdivided driving or impeller elements of the torque converter;

FIGURE 4 is a diagrammatic view of still a further embodiment in accordance with the present invention similar to FIGURE 3 and showing a torque converter provided with subdivided impeller or driving elements as well as with subdivided reactor elements, and FIGURE 5 is a diagrammatic view of still another embodiment in accordance with the present invention showing a torque converter having subdivided reactor elements or guide members and provided with a brake.

Referring now to the drawing, wherein like reference numerals are used throughout the various views to designate like parts, and more particularly to FIGURE 1, reference numeral 4 generally designates the torque converter which includes a driving member or impeller 5 suitably driven over flange portion 6' from the drive shaft 6 which, for example, may form part or be connected with the engine or crankshaft of the driving unit. The torque converter 4 further includes a driven member or turbine 7 and two separate reactor elements or guide members 8 and 9. The drive or transmission of torque takes place from the driven element or turbine 7 over a shaft 18 which is connected with the input of a mechanical change-speed gear of any suitable construction and only schematically indicated in the drawing in block diagram, for example, of a planetary gear provided with two planetary gear sets, as more fully described in the copending application Serial No. 625,827, now abandoned, filed December 3, 1956, and entitled "Planetary Gear Transmission." Of course, it is understood that any other suitable mechanical change-speed gear, such as a countershaft change-speed transmission or a combined planetary gear and countershaft change-speed transmission of known construction may be connected with the shaft 18 of the hydrodynamic device.

Both stator or guide elements 8 and 9 follow each other directly in the direction of the circulation of the fluid within the torque converter 4 which circulates therein in the counterclockwise direction as seen in the drawing. Consequently, in the direction of flow of the hydraulc fluid, the stator or guide elements 8 and 9 are connected in the fluid circuit behind the driven member or turbine 7 and are thereby disposed in the torque converter 4 within the region of least diametric dimension of the fluid circulation or vortex with respect to the axis of rotation of the torque converter 4.

The guide or stator element 8 which directly adjoins or follows the driven or turbine member 7 in the direction of circulation of the hydraulic fluid is supported against the stationary transmission housing indicated only schematically in the drawing and designated therein by reference numeral 11 by means of a free-wheeling device 10, such as a one-way brake or the like. The second guide or reactor element 9 is connected with the first reactor or guide element 8 by means of a disengageable clutch 12. The clutch 12 is a clutch effective on both sides thereof and is disposed directly adjacent the torque converter 4. The clutch may be actuated at will in any suitable manner, for example, by a suitable control arrangement depending on the position of the gas pedal and is preferably constructed as a friction clutch, for example, as a friction disk clutch.

*Operation*

The operation of the embodiment of FIGURE 1 is as follows:

In the normal driving operation, the clutch 12 is disengaged and therewith the second half of the stator or guide member formed by the stator or guide element 9 is disengaged. Consequently, the guide or stator element 9, driven by the circulating hydraulic fluid, may rotate freely without exerting any moment or torque. The exit angle of the guide or reactor member is thereby relatively small and the input capacity of the entire torque converter over a range of rotational speeds is relatively large. With the same engine characteristic the relatively large power capacity means that the engine torque is attained already with relatively small engine rotational speeds. The losses are correspondingly small and, consequently, an economic driving in one or several upper speeds of the transmission is rendered possible thereby.

For purposes of increasing the driving output, for example, for purposes of passing or in case of danger, the second guide or stator element 9 is rigidly connected with the first guide or reactor element 8 by engagement of the clutch 12. As a result of engagement of clutch 12, the exit angle of the stator or guide member is so changed that the input capacity of the torque converter effectively decreases rapidly, i.e., the same engine torque is only attained again with higher engine rotational speeds. Consequently, the driving power output is increased in the desired sense or direction. The arbitrary or selective actuation of the clutch 12 can take place, for example, by depressing the gas pedal over a predetermined pressure point, i.e., beyond a predetermined point of resistance as determined, for instance, by a spring-loaded abutment member lying in the path of the gas pedal and serving the control of hydraulically actuated clutch 12.

FIGURE 2 shows a torque converter 4 of basically the same construction as that of FIGURE 1. However, the second stator element 9 is connected with the housing 11 over clutch 12. In addition thereto, a second free-wheeling device 13 is inserted between the clutch 12 and the stationary transmission housing 11.

Such a construction offers the advantage that under operating conditions within the range of acceleration, both guide or stator elements 8 and 9 may also disengage themselves sequentially one after the other from the rigid connection thereof with the stationary housing 11 over the free-wheeling devices 10 and 13, respectively, and may thereby rotate freely depending on the conditions of flow or vortex of the hydraulic fluid in the torque converter.

Otherwise, the operation of the embodiment of FIGURE 2 is the same as that of FIGURE 1.

The embodiment according to FIGURE 3 shows a torque converter, generally designated again by reference numeral 4, which includes again a driven member or turbine wheel 7, operatively connected with the shaft 18, which in turn is connected with any suitable change-speed gear. The driving member or impeller in this embodiment consists of two driving or impeller elements 14 and 15, both of which are disposed ahead of the driven member or turbine 7 in the direction of flow of the hydraulic fluid which again takes place in a counterclockwise direction, as viewed in FIGURE 3. The driven member or turbine 7 is followed in the direction of flow by the guide or stator member 16 which is formed of a single integral member and which, as described hereinabove, is connected with the stationary transmission housing 11 over a free-wheeling device 10 which permits rotation of the stator or guide member 16 only in one direction but holds the same stationary with respect to the housing 11 if it attempts to rotate in the opposite direction.

The first driving or impeller element 15 is disposed with the exit thereof along a smaller diameter with respect to the axis of rotation of the torque converter 4 than the second driving or impeller member 14 adjoining the same in the direction of circulation of the hydraulic fluid. The first driving or impeller element 15 is rigidly connected with the drive shaft 6 over flange portion 6' which may also constitute part of the rotating torque converter casing whereas the second impeller or driving element 14 is connected with the driving shaft 6 over a disengageable clutch 17. The output shaft 18 again may be connected with any suitable mechanical change-speed gear as mentioned hereinabove.

*Operation*

The operation of the torque converter in accordance with FIGURE 3 is as follows:

In normal driving operation, the clutch 17 is engaged and therewith both driving or impeller elements 14 and 15 are rigidly connected with each other. The two impeller or driving elements 14 and 15 thereby provide a favorable efficiency and a relatively large power input capacity of the torque converter with relatively small power losses within the torque converter 4. For purposes of acceleration, the clutch 17 is disengaged in any suitable manner, for example, by a kick-down control beyond a predetermined point of resistance whereupon the second driving or impeller element 14 is released. The torque converter power input capacity thereby decreases by a relatively large amount and the same engine torque is only attained again with increased engine rotational speed. In this manner, the desired increased driving power output is again obtained.

Thus, the manner of operation of the embodiments of FIGURES 1 and 2, on the one hand, and of FIGURE 3, on the other, is different as considered from the point of view of operation of clutches 12 and 17. Whereas with a guide or stator member subdivision, as shown in FIGURES 1 and 2, the clutch 12 is disengaged in normal operation of the torque converter 4, the clutch 17 is engaged in the same case with a torque converter having a subdivided impeller member to obtain the same effect. The effect with respect to increase in the driving power output, however, is the same in both arrangements, only the controls for achieving the same are reversed, namely, in FIGURES 1 and 2 the clutch has to be engaged, whereas in the embodiment according to FIGURE 3 the clutch has to be disengaged.

The clutches 12 and 17 for connecting the stator or guide vane elements as well as the impeller or driving elements are constructed as friction disk clutches which are preferably actuated hydraulically.

It is also possible to utilize a disengageable means, for example, a friction disk means to selectively connect the second driving or impeller element 14 of FIGURE 3 with the stationary housing 11 or a part thereof. The torque converter 4, with such disengageable means or friction disk brake engaged, thereby becomes operative as a hydrodynamic brake. It is possible in this manner, especially with high speeds, to obtain an intensive braking effect without loading, for example, the wheel brakes. The engine may thereby continue to run, which is particularly advantageous and may thereby drive the first impeller or driving element 15 of FIGURE 3. The disengageable means, such as a friction disk brake or friction band type brake, may thereby be used in lieu of or in addition to clutch 17.

It is, of course, understood that a similar braking action may also be obtained in FIGURES 1 and 2 if the driving or impeller elements 5 thereof are subdivided as shown in FIGURE 3 and provided with an additional brake for the impeller or driving element 14.

A particularly appropriate embodiment is shown in FIGURE 4. The torque converter has two stator or guide wheel elements 8 and 9 as well as two impeller or driving elements 14 and 15 which follow alternately in the direction of circulation or vortex of the hydraulic fluid again assumed to take place in the counterclockwise direction, as seen in FIGURE 4. The first guide or stator element 8 is connected with the stationary housing 11 over the free-wheeling device 10 and is adapted to be rigidly connected with the second guide or stator element 9 by means of a disengageable clutch 12. The second driving or impeller element 14 may be selectively connected by means of disengageable clutch 17 with the first impeller or driving element 15 or by means of brake 19 with the stationary housing 11 or a part thereof.

*Operation*

When the clutch 17 is engaged and the brake 19 is disengaged, normal operation takes place whereas, with the clutch 17 disengaged and the brake 19 engaged, a condition of hydrodynamic braking operation is obtained. If both clutch 17 and brake 19 are disengaged, then the torque converter 4 of FIGURE 4 operates in the accelerating range or condition thereof.

Engagement of the clutch 12 also decreases the effective power input capacity of the torque converter 4 within the accelerating range thereof, as described hereinabove, in connection with FIGURES 1 and 2, while disengagement of clutch 12 effectively increases the power input capacity of the torque converter. Furthermore, the control of clutches 17 and 12 as well as of brake 19 may be realized in any suitable manner, for instance, clutches 17 and 12 may be controlled simultaneously or sequentially.

The same braking effect as described in connection with FIGURES 3 and 4 may be obtained if the second guide or stator element 9 is adapted to be braked by means of a disengageable means such as brake 20 of FIGURE 5 which illustrates such an arrangement. The first guide or stator element 8, again suitably connected with the stationary housing 11 over free-wheeling device 10 is adapted to be connected with the second guide or stator element 9 thereof by means of disengageable clutch 12. In the alternative, with the clutch 12 disengaged, the second guide or stator element 9 may be braked with respect to the stationary transmission housing 11.

*Operation*

In the embodiment of FIGURE 5, three operating ranges may also be obtained, namely, (*a*) normal operation with the clutch 12 and brake 20 disengaged, (*b*) acceleration with clutch 12 engaged and brake 20 disengaged, and (*c*) braking with brake 20 engaged and possibly also with brake 12 engaged to increase the hydrodynamic braking effect.

It is also understood that the embodiment of FIGURE 5 may be provided with a subdivided impeller member consisting of impeller elements 14 and 15 as arranged either according to FIGURE 3 or FIGURE 4 and including a clutch 17 and possibly a brake 19, whereby the control of the additional engageable means 17 and 19 may be integrated in the control arrangement of FIGURE 5 in any suitable manner to produce the desired effects.

While any suitable control arrangement for controlling the various clutches and brakes may be provided in connection with the various embodiments of the present invention, such as mechanical or electrical control systems, it is preferred to actuate all clutches and/or brakes of the present invention hydraulically which may also take place automatically in any suitable manner, for example, in response to torque or speed conditions of the engine and/or of the vehicle, with the exception of the selective or arbitrary actuation of the various engageable means 12, 17, 19 and 20 necessary to produce the desired acceleration effect attainable with any one of the embodiments described hereinabove and which may be obtained, for example, by selectively depressing the gas or accelerator pedal beyond a predetermined pressure point or point of resistance.

The torque converter in each case of the various embodiments described hereinabove includes for the impeller, turbine and stator elements a plurality of annularly disposed guide vanes, respectively, having a predetermined angular position in the torque converter.

Furthermore, the mechanical change-speed gear may be controlled in any suitable manner, either manually, semi-automatically, for example, by means of a preselector or push buttons, or fully automatically in response to the engine and/or vehicle speed and/or in response to the engine torque and/or setting of the gas pedal. Furthermore, the control arrangement of the mechanical change-speed gear connected with each output shaft 18 may be appropriately integrated with the control arrangement for the torque converter unit.

It is also understood that the various features of the present invention, as illustrated in the individual embodiments thereof, may be exchanged or combined with each other in the various embodiments in any suitable manner.

While we have shown and described several preferred embodiments in accordance with the present invention, it is understood that the same is not limited thereto but is susceptible of various changes and modifications within the spirit of the present invention, and we intend to cover all such changes and modifications as encompassed by the appended claim.

We claim:

A torque-transmitting device for motor vehicles including a change-speed transmission having a mechanical change-speed gear unit having input means, comprising impeller means subdivided into two separate impeller elements movable relative to each other, a turbine member operatively connected with an output means, and stator means, said stator means being subdivided into two separate stator elements movable relative to each other, said impeller means, turbine member, and stator means together forming a toroidal fluid circuit having an axis of rotation, said separate impeller and stator elements being arranged alternately with respect to each other in the direction of circulation of the hydraulic fluid within the converter, the first of the separate stator and impeller elements being disposed along a smaller diameter with respect to the axis of rotation of the converter than the second impeller and stator elements following in the direction of circulation of the fluid, a relatively stationary housing for said transmission, first engageable means for selectively and arbitrarily connecting one of said two stator elements with the other of said two stator elements, and second engageable means including means for selectively and arbitrarily connecting one of said impeller elements with the stationary housing and the other of said two impeller elements, respectively, to thereby provide a torque-transmitting device having a plurality of torque-transmitting ranges with vastly different output capacities.

References Cited in the file of this patent

UNITED STATES PATENTS

| | | |
|---|---|---|
| 1,199,360 | Fottinger | Sept. 26, 1916 |
| 1,960,705 | Kochling | May 29, 1934 |
| 1,970,236 | Kluge et al. | Aug. 14, 1934 |
| 2,037,252 | Martyrer et al. | Apr. 14, 1936 |
| 2,120,896 | Koeppen et al. | June 14, 1938 |
| 2,194,949 | Lysholm | Mar. 26, 1940 |
| 2,196,585 | Gette | Apr. 9, 1940 |
| 2,271,919 | Jandasek | Feb. 3, 1942 |
| 2,298,649 | Russell | Oct. 13, 1942 |
| 2,332,593 | Nutt et al. | Oct. 26, 1943 |
| 2,333,253 | Jandasek | Nov. 2, 1943 |
| 2,380,074 | Roche | July 10, 1945 |
| 2,453,795 | Jandasek | Nov. 16, 1948 |
| 2,606,460 | Kelley | Aug. 12, 1952 |
| 2,607,456 | Jandasek | Aug. 19, 1952 |
| 2,612,754 | Swift | Oct. 7, 1952 |
| 2,697,330 | Odman | Dec. 21, 1954 |
| 2,710,504 | Dodge | June 14, 1955 |
| 3,043,161 | Tuck | July 10, 1962 |

FOREIGN PATENTS

| | | |
|---|---|---|
| 420,252 | Great Britain | Nov. 28, 1934 |
| 780,983 | Great Britain | Aug. 14, 1957 |